(12) United States Patent
Alexander et al.

(10) Patent No.: US 6,529,547 B1
(45) Date of Patent: Mar. 4, 2003

(54) STORAGE AND REPRODUCTION METHOD AND APPARATUS

(75) Inventors: Paul Francis Alexander, Potomac, MD (US); David John, Buckinghamshire (GB)

(73) Assignee: International Mobile Satellite Organization, London (GB)

( * ) Notice: Subject to any disclaimer, the term of this patent is extended or adjusted under 35 U.S.C. 154(b) by 0 days.

(21) Appl. No.: 09/214,065

(22) PCT Filed: Jun. 19, 1997

(86) PCT No.: PCT/GB97/01661

§ 371 (c)(1),
(2), (4) Date: Sep. 20, 1999

(87) PCT Pub. No.: WO98/00937

PCT Pub. Date: Jan. 8, 1998

(30) Foreign Application Priority Data

Jun. 28, 1996 (GB) .............................................. 9613680

(51) Int. Cl.[7] ................................................. H04Q 1/20
(52) U.S. Cl. ........................ 375/224; 375/219; 375/220; 340/605; 340/620
(58) Field of Search ................................. 375/224, 219, 375/220; 324/600, 605, 607, 620, 250, 263; 455/67.1, 115, 226.1; 702/108, 117; 714/712, 714

(56) References Cited

U.S. PATENT DOCUMENTS

| 4,972,275 | A | | 11/1990 | Spitz et al. .................... 360/55 |
| 5,247,399 | A | | 9/1993 | Senba ......................... 386/104 |
| 5,420,516 | A | * | 5/1995 | Cabot ......................... 324/620 |
| 5,444,686 | A | * | 8/1995 | Dunlavy ................... 369/47.17 |
| 5,463,633 | A | * | 10/1995 | Lopez-Ramirez ........... 714/714 |
| 5,581,190 | A | * | 12/1996 | Herring et al. ............. 324/605 |

* cited by examiner

*Primary Examiner*—Shuwang Liu
(74) *Attorney, Agent, or Firm*—Banner & Witcoff, Ltd.

(57) ABSTRACT

Digital audio recording equipment is used to record modulated signals, such as the RF test signals generated by test modems. If the modulated signals are outside the audio frequency range, they are down-converted into the audio frequency range using a mixer, local oscillator and a filter. The digitally converted data are recorded onto a suitable medium, such as a DAT, CD or a computer memory. The data is then disseminated for reproduction by a suitable digital audio player. The reproduced audio signal may be up-converted to the desired radio frequency using a mixer, local oscillator and a filter. The reproduced signal may be used to test demodulators, codecs or transceivers. The signals output by the transceiver and the reproduced signal may be recorded on different channels of the digital audio recording equipment. The recording equipment may be used to capture RF signals for later analysis. The player may be used for reproducing modulated signals for broadcast.

11 Claims, 4 Drawing Sheets

STORAGE AND REPRODUCTION METHOD AND APPARATUS

TECHNICAL FIELD

The present invention relates to a method and apparatus for storage and/or reproduction of modulated signals, particularly but not exclusively in apparatus for testing radio equipment.

BACKGROUND ART

In one conventional method of testing radio equipment, a radio transmitter is connected directly to the equipment to be tested and the radio transmitter generates test signals. Typically, the transmitter is connected to the equipment to be tested via a channel simulator, which simulates effects such as fading, Doppler shift and interference. An example of an RF channel simulator is described in GB-A-2283392. These functions may be built into the transmitter.

This conventional method requires the transmitter and channel simulation equipment to be transported to the test site. Typically, the transmitter and channel simulator are expensive equipment and it is therefore very costly to provide multiple sets of such signal generation equipment if more than one party needs to test their equipment at the same time.

In an alternative conventional method, test signals are broadcast over the air, so that the signal generation equipment does not need to be transported to the receiving party, and multiple receiving parties can test their receiving equipment at the same time. However, this method is not entirely satisfactory, because the signal is degraded between the transmitting and the receiving party in an unpredictable manner, so that the desired characteristics of the test signal may be lost.

Moreover, broadcasting such test signals over the air involves the risk of disclosing confidential information concerning signal characteristics to third parties.

DISCLOSURE OF THE INVENTION

According to one aspect of the present invention, there is provided a method and apparatus for storing radio frequency signals, in which a narrow band of the radio frequency spectrum, having an audio frequency bandwidth, is down converted into the audio frequency range and recorded on an audio-frequency storage medium so that the amplitude, phase and frequency characteristics of the RF spectrum are preserved.

According to another aspect of the present invention, there is provided a method and apparatus for generating radio frequency signals, in which an audio-frequency signal is reproduced from the audio-frequency digital storage medium and is converted into a narrow band of the radio frequency spectrum so as to reproduce the amplitude, phase and frequency characteristics of a radio frequency signal.

In this way, radio frequency signals can be stored and reproduced accurately using inexpensive and commonly available digital audio storage media, such as digital audio tapes, optical or magneto-optical discs or computers having audio processing facilities.

Advantageously, such a method and apparatus can be used to provide test signals for testing the performance of a demodulator and/or a codec. Alternatively, a two-channel digital audio recorder may be used to record RF signals received by a device to be tested on one channel, and the signals generated by the device under test in response to the test signals, on the other channel. Thus, a two-way protocol exchange can be stored conveniently for later analysis.

In another advantageous embodiment, the digital audio recorder may be used to record burst signals for analysis in non-real time. The recording of burst signals may be triggered by the detection of such burst signals.

In another advantageous embodiment, the reproduced test signals are simultaneously supplied to multiple demodulators or signal analysers, for teaching purposes.

In another advantageous embodiment, multiple copies of the recorded signal are distributed to local broadcasting stations for subsequent broadcast. In this way, broadcast programmes can be disseminated in a convenient form, without requiring complex modulating equipment at the broadcast station.

BRIEF DESCRIPTION OF THE DRAWINGS

Specific embodiments of the present invention will now be described with reference to the accompanying drawings in which.

MODES FOR CARRYING OUT THE INVENTION

Figure 1:
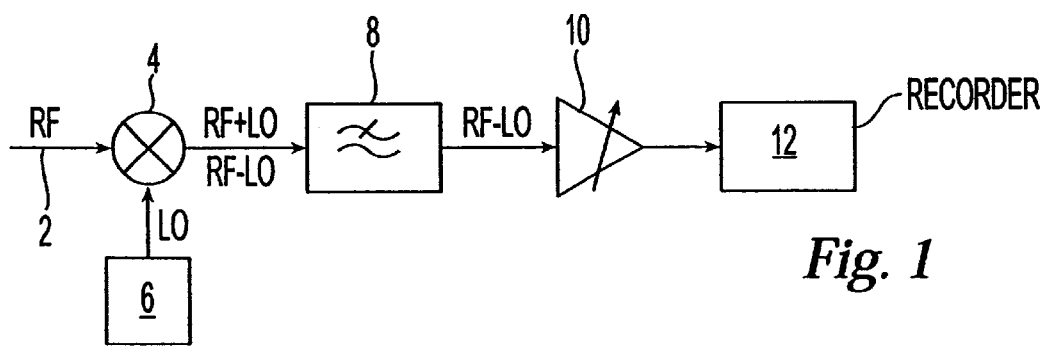
FIG. 1 is a schematic diagram of apparatus for recording radio frequency signals in a first embodiment of the present invention.

Apparatus for recording a narrow band of the RF spectrum on a digital audio recorder will now be described in detail with reference to FIGS. 1 and 2. Radio frequency signals RF are supplied on a line 2. Line 2 may be connected to a receiving antenna, to an RF signal generator or to a test modem. In one example, the line 2 is connected to an Inmarsat-M™ modem which generates signals complying with the Inmarsat-M™ signal parameters, at around 70 MHz. The Inmarsat -M satellite system is described in more detail in "Satellite Communications:Principles and Applications" by Calcutt & Tetley, First Edition, 1994, published by Edward Arnold.

The RF signals are input to a mixer 4, where they are multiplied with the output of a local oscillator 6. The local oscillator 6 generates a single frequency. In one example, the local oscillator 6 is a Hewlett Packard 8648B generating an output signal at 70 MHz, although a simpler oscillator such as a crystal oscillator may be used provided it can generate stable signals in the radio frequency range of interest.

The output of the mixer 4 comprises signals of frequency R+LO and RF−LO, where RF is the radio frequency and LO is the local oscillator output frequency. For example, if the frequency of the R signal is 70.015 MHz and the local oscillator output frequency is 70.000 MHz, the output of the mixer 4 will comprise signals of frequencies 140.015 MHz (RF+LO) and 15 kHz (RF−LO).

If another signal is present at 69.085 MHz, this signal will generate an "image" signal, also at 15 kHz. This image signal may be removed by well-known techniques, such as two-stage down-conversion with the undesired frequencies being filtered out after the first stage. If the RF signals are output from a test modem, such signals at less than the oscillator frequency LO may not be generated.

Alternatively, the "image" signal of lower frequency than the oscillator frequency LO may be passed for recording and the signal having a higher frequency than the oscillator frequency may be filtered out. The "image" signal has a reversed spectrum, but this may be compensated for on playback, as described below.

The output signal of the mixer 4 is passed through a filter 8 which passes the frequency RF−LO but removes the frequency RF+LO. For example, the filter may be a low-pass filter such as a Mini Circuits SLP-1.9. The signal RF−LO is output from the filter 8 to a variable gain amplifier 10 or a fixed gain amplifier of suitable gain, which controls the level of the signal input to a recorder 12. In one example, the amplifier is a Mini Circuits ZFL-500 amplifier.

Figure 9:
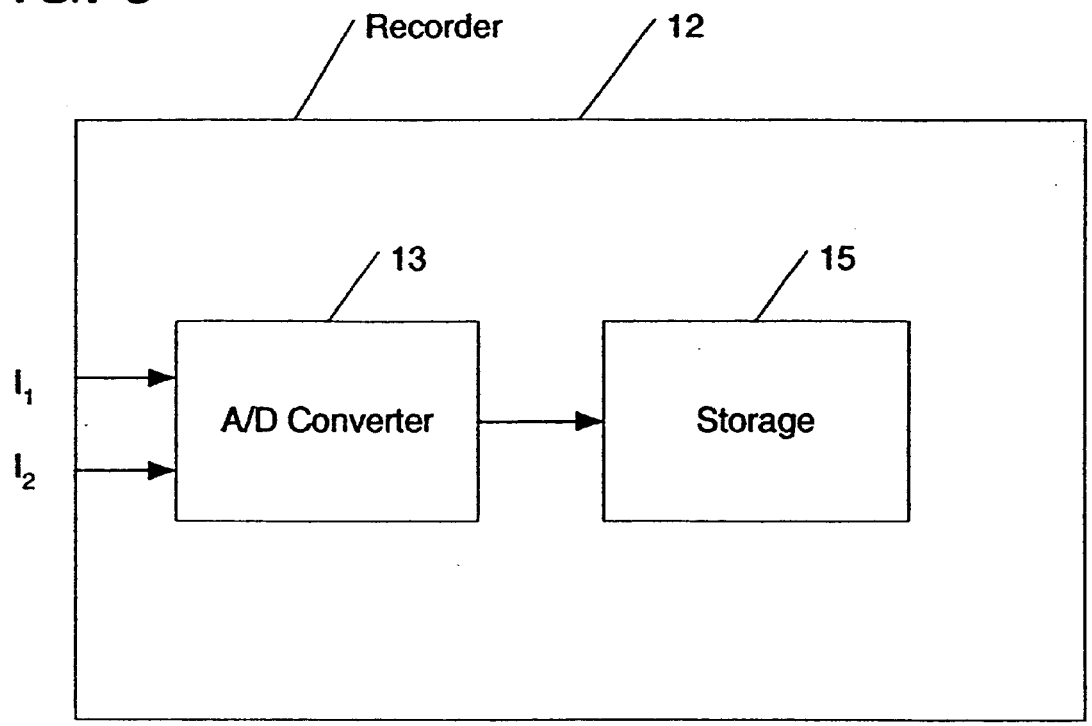
FIG. 9 is a block diagram of an exemplary embodiment of a recorder.

"The recorder has at least one analog input which receives the output of the variable amplifier 10. The recorder 12 includes an A/D converter and means for storing the output of the A/D converter. FIG. 9 is a block diagram of an exemplary recorder 12 showing the A/D converter 13 and the means for storing 15 to store digital signals.

A number of different types of digital audio recorder are currently widely available at low cost. In one specific example, the recorder 12 was a SONY™ PCM 2600 digital audio tape recorder. The frequency response of such a recorder, as shown by the dotted line in the graph of FIG. 2, is substantially flat between 20 Hz and 21 kHz, which corresponds to the audio frequency range. Alternatively, the recorder 12 may be a personal computer, such as a PC-compatible or Macintosh™ computer, fitted with an audio card having an analog input and an A/D converter. The digitally converted signal may be stored in the main memory of the computer, and may additionally be stored on a non-volatile storage medium, such as a hard disc or recordable CD.

The filter 8 can be dispensed with if the variable amplifier 10 has a frequency response which is sufficiently low to filter out the frequency RF+LO, or if the response characteristic of the recorder 12 excludes the frequency RF+LO. However, the application of high-frequency signals to the recorder 12 may cause interference in the electronic circuitry of the recorder, in which case the presence of the filter 8 is advantageous.

Figure 2:
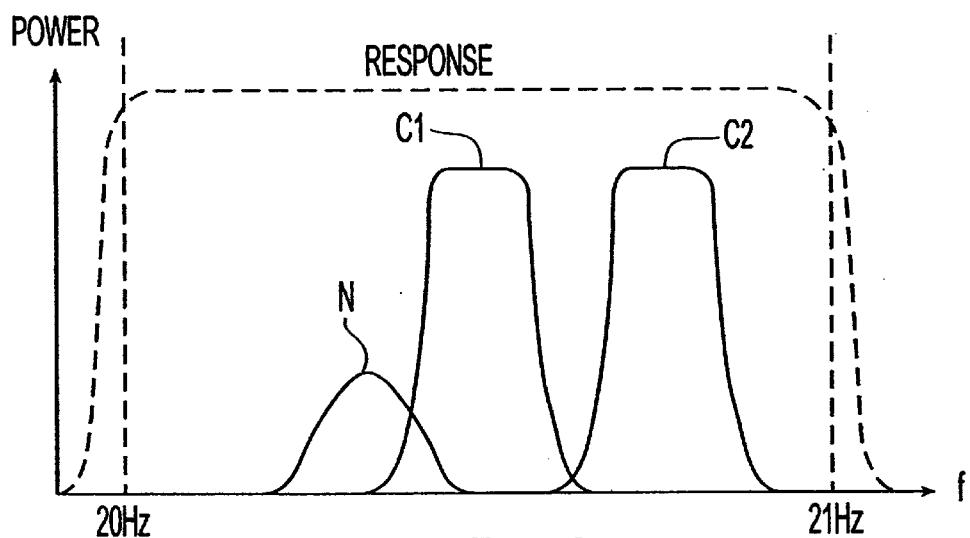
FIG. 2 is a diagram showing the frequency response of an audio frequency recorder and the amplitude of signals down-converted from a narrow band of the RF spectrum into the audio frequency spectrum.

FIG. 2 shows, together with the frequency response characteristic of the recorder 12, an example of the frequency spectrum of the down-converted signal RF−LO. The signal RF contains signalling in two channels C1 and C2 of 5 kHz bandwidth, at 70.010 and 70.015 MHz respectively. A noise signal N is also present and interferes with the first channel C1. The signal RF is down-converted so that the channel C1 is recorded at 10 kHz and the second channel C2 is recorded at 15 kHz. It can therefore be seen that the device shown in FIG. 1 is capable of recording accurately the characteristics of a narrow-band RF spectrum, such as modulation characteristics, fading, frequency drift and interference. It is for this reason that a digital audio recorder of sufficiently high fidelity should be used, in order to preserve and reproduce the amplitude phase and frequency characteristics of the RF spectrum.

Certain types of digital audio recorder which compress audio signals using an algorithm optimized for music or speech, such as the SONY minidisc™ recorder, may not be suitable for this purpose.

An apparatus for reproducing the recorded RF signal will now be described with reference to FIG. 3. A digital audio player 12' may be used to clay back the digital audio signals stored by the recorder 12. The player 12' is compatible with the recorder 12 with which the signal was recorded, and may comprise similar or the same equipment as the recorder 12. The player 12' may play back a digital audio tape recorded by the recorder 12 or may reproduce the audio signal from a CD or hard disc on which the digital audio data were recorded by the recorder 12. The CD may alternatively be a pressing taken from a master recording by the recorder 12. Alternatively, the digital audio data CD may be sent as a file of suitable format, such as a wave format, to the computer forming the player 12'. The audio file may be sent between the computers through a communications link of any suitable type.

Alternatively, the digital audio data may be synthesized by a suitably programmed computer so that, when reproduced, the digital audio data generate an RF signal having the desired characteristics. The synthesized digital audio data may be stored on any of the storage media described above, for reproduction by the player 12'.

Figure 10:
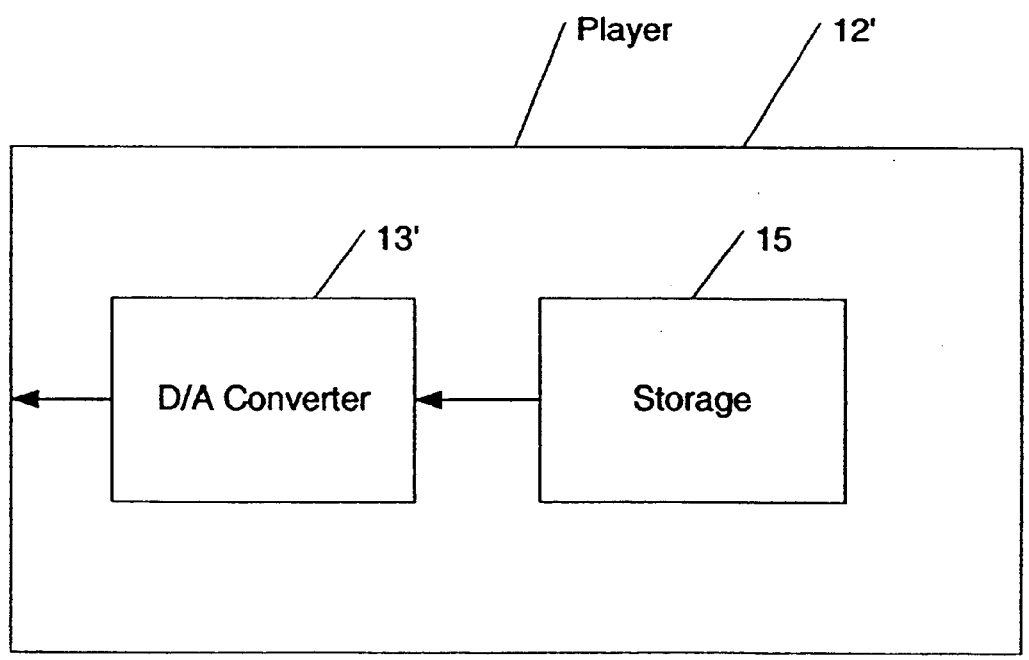
FIG. 10 is a block diagram of an exemplary embodiment of a player.

"FIG. 10 is a block diagram of an exemplary embodiment of a player 12' having a digital/analog converter 13' and a means for storing 15 to store digital signals."

The player 12' converts the digital audio data to an analog audio intermediate frequency signal IF, on line 14, which is connected to a mixer 16. A further local oscillator 18 outputs an oscillator signal of frequency LO' which may correspond to the frequency of the output of the local oscillator 6 or may be a different frequency, to another input of the mixer 16. The mixer 16 multiplies the two input signals together and outputs signals of frequency LO'+IF and LO'−IF. In one example, the intermediate frequency IF is 20 kHz and the local oscillator frequency LO' is 70 MHz, so that the output of the mixer 16 comprises signals of frequency 70.02 MHz and 69.98 MHz. The output of the mixer 16 is passed through a band-pass filter 20, which removes the component LO'−IF and allows the component LO'+IF to pass to an amplifier 22 of selected fixed or variable gain, from which the RF signal is output at output 24. If the originally recorded signal was an "image" signal, the component LO'+IF is filtered out and the component LO'−IF is passed instead.

Figure 3:
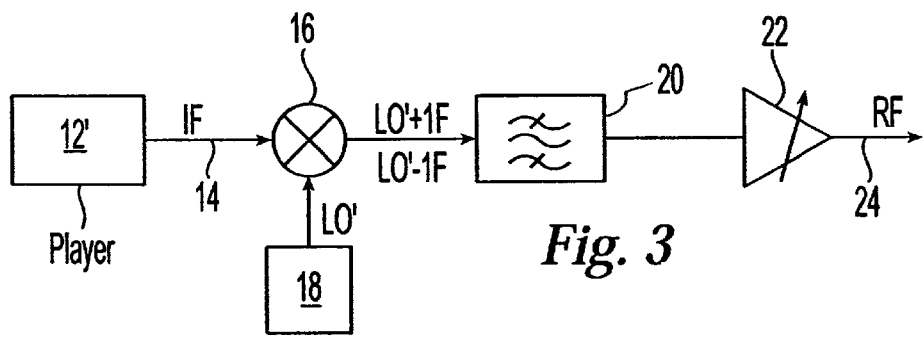
FIG. 3 is a diagram of apparatus for reproducing RF signals from a digital audio storage medium in a second embodiment of the present invention.

Hence, if the digital audio data recorded by the recorder 12 in FIG. 1 is played back by the player 12' of FIG. 3, the characteristics of the RF signal input on the line 2 are reproduced accurately on the output 24 of the amplifier 22, and can be applied as a test signal to a receiver to be tested. The reproduced RF signal may be shifted in frequency relative to the recorded RF signal by choosing the frequency LO' to be different from LO.

Thus, instead of transporting test transmitter equipment to the receiver to be tested, one need only transport a digital audio tape or compact disc, or send a data file to the test site, where the test signal can be reproduced using simple and inexpensive up-converting equipment and a filter. The use of standard digital audio recording media is particularly advantageous, since recording and play back equipment for such media are commonly available. However, if such equipment is not available at the test side, a portable DAT or CD player or a portable computer can be easily transported to the test site.

Moreover, the RF test signal can be reproduced without broadcasting it over the air, thus avoiding the risk of eavesdropping by third parties and ensuring that a test signal having the required characteristics is applied to the test equipment without further degradation caused by broadcasting the test signal over the air.

Figure 4:
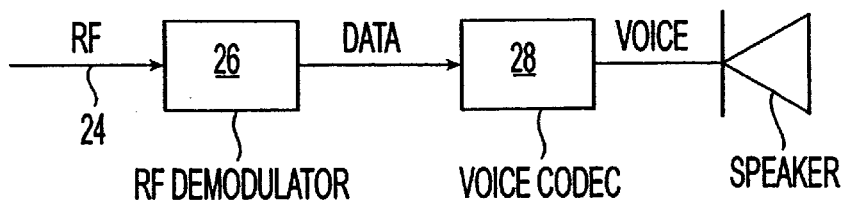
FIG. 4 is a diagram showing a third embodiment including the embodiment of FIG. 3.

A third embodiment of the apparatus shown in FIG. 3 will now be described with reference to FIG. 4. The apparatus to be tested comprises an RF demodulator 26, connected via a suitable connector to the output 24, which demodulates the RF signal to produce data which is input to a voice codec 28 so as to produce a voice signal which is output by a speaker 30.

In this example, the RF signal comprises test data for testing the performance of the codec 28. The radio frequency signal on the line 24 is a reproduction of an RF signal input on the line 2 in the apparatus of FIG. 1, the RF signal being generated for example by an Inmarsat-M™ modem.

Figure 5:
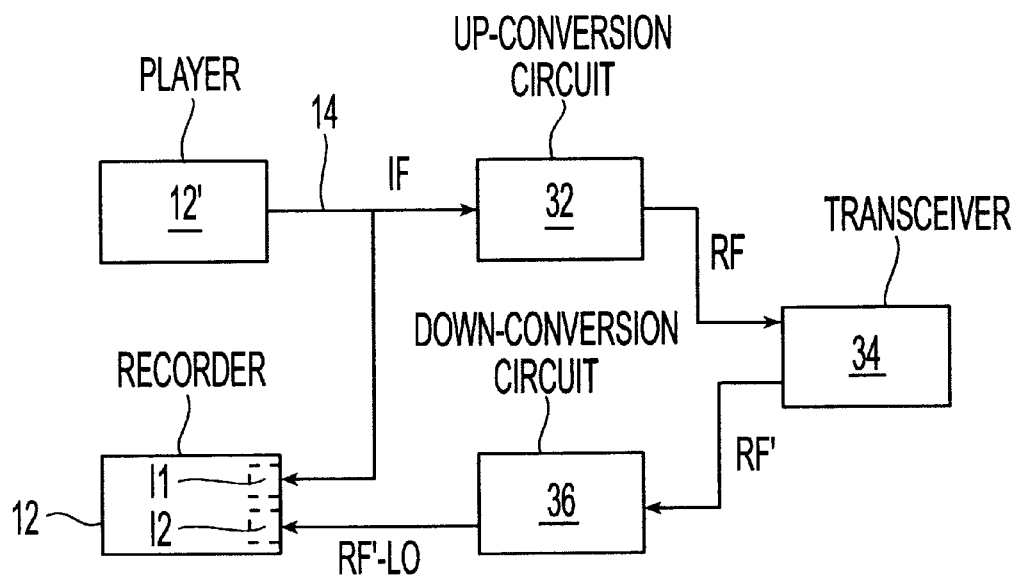
FIG. 5 is a diagram showing a fourth embodiment including the embodiments of FIGS. 1 and 3.

A fourth advantageous embodiment of the present invention will now be described with reference to FIG. 5, in which a reproduced test signal is applied to a transceiver 34 and the test signal and the response of the transceiver 34 are recorded on separate channels for later analysis.

The reproduced audio frequency test signal IF is output from the player 12' to an up-conversion circuit 32, comprising or example the mixer 16, local oscillator 18, bandpass filter 20 and amplifier 22 of the embodiment of FIG. 3. The RF-converted test signal from the output 24 is input to the transceiver 34 under test, which may for example be a prototype Inmarsat-M™ modem. In this example, the RF test signal contains the messages normally sent by a transmitter engaged in a call set-up protocol. The transceiver 34 transmits response signals RF', comprising responses to the call set-up messages. These response signals RF' are down-converted by a down-conversion circuit 36, which may for example comprise the mixer 4, local oscillator 6, low-pass filter 8 and amplifier 10 of the embodiment in shown in FIG. 1.

"The down-converted output signal RF'–LO of the down-conversion circuit 36 is input to one channel input 12 of the digital audio recorder 12 through a suitable connector. The audio frequency test signals IF output by the player 12' are connected via an audio signal connector to another input channel $I_1$ of the recorder 12. Almost all digital audio recorders, including audio processing cards for computers, are able to record stereo channels and therefore the input channels $I_1$ and $I_2$ may advantageously be the left and right stereo inputs of the recorder 12. Subsequently, the recordings of either of the channels $I_1$ and $I_2$ can be analyzed to determined whether the transceiver 34 complies with the desired standards, for example by outputting either of the channel outputs to an apparatus as in the embodiment in FIG. 3 or by analyzing directly the audio frequency outputs of either of the channels on a suitably programmed computer, so as to interpret the timing and type of signals output by the transceiver 34."

A fifth advantageous embodiment of the present invention will now be described with reference to FIG. 6. This is used to record unidentified or interfering signals, for later analysis.

RF signals are received by an antenna 38 and input to a spectrum analyser 40, which displays the power spectrum of an RF band. An operator monitors the spectrum analyser 40 and detects the occurrence of an unexpected signal. The RF signals are input to apparatus similar to that of FIG. 1. The local oscillator 6 is tunable by the operator to select a wave band containing the signal of interest. The signal is recorded on the digital audio recorder 12 for later analysis.

For example, if an error has occurred in the frequency allocation of a channel, the apparatus shown in FIG. 6 may be used to record the incorrectly allocated channel, which may later be analysed to determine the identity of the user to whom the channel was allocated. It may then be determined whether the error was caused by the user or by an incorrect allocation by the system.

Figure 6:
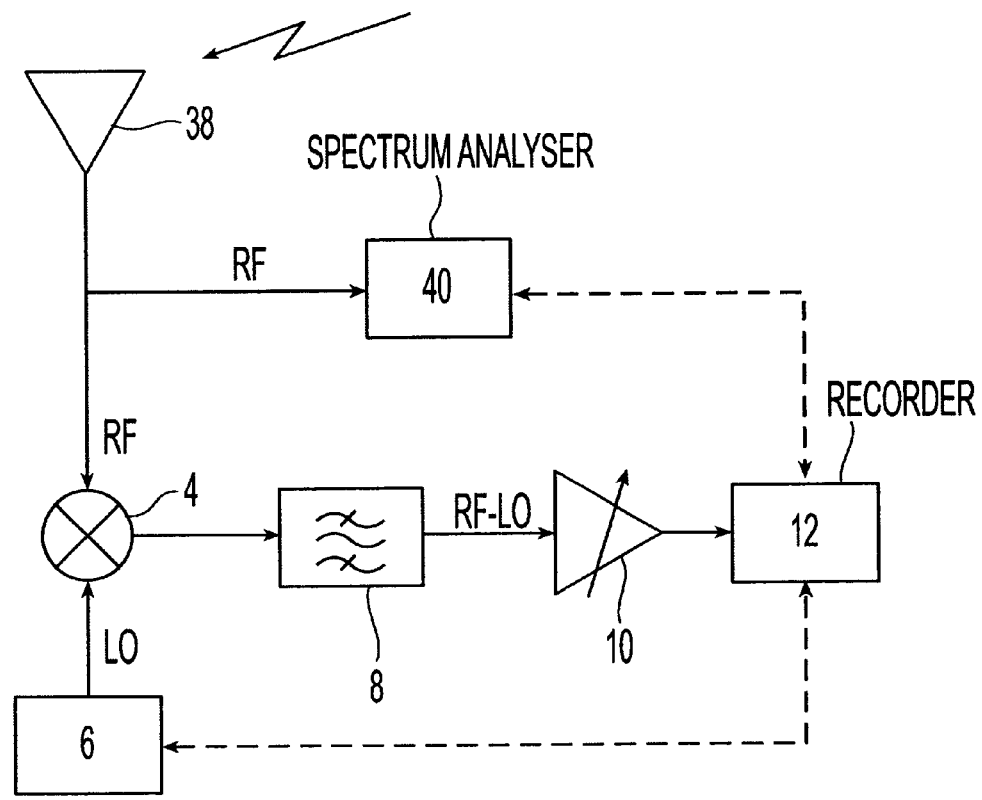
FIG. 6 is a diagram showing a fifth embodiment including the embodiment of FIG. 1.

The apparatus shown in FIG. 6 may be automated so that detection of an RF signal having predefined characteristics by the spectrum analyser 40 initiates recording by the digital audio recorder 12. For example, the spectrum analyser 40 is controlled by a computer, which receives spectrum analysis data from the spectrum analyser 40. The recorder 12 is implemented as an audio card on the computer and the computer begins storing digital audio data from the audio card if the output of the spectrum analyser 40 satisfies a predetermined criterion. The local oscillator 6 is also tunable under the control of the computer. In this way, the computer can control the spectrum analyser 40 to sweep through a wide band of the radio frequency spectrum and the local oscillator may be set so that signals of interest can be recorded as they are detected.

Alternatively, the spectrum analyser 40 may be dispensed with altogether and the computer may itself analyse the output RF–LO so as to determine whether unexpected signals are present. The digital audio data output by the audio card may be buffered, so that, if it is determined that an unexpected signal is present in the buffered data, the buffered data is recorded. Thus, none of the unexpected signal is lost due to the delay between detecting the unexpected signal and initiating recording by the recorder 12.

Figure 7:
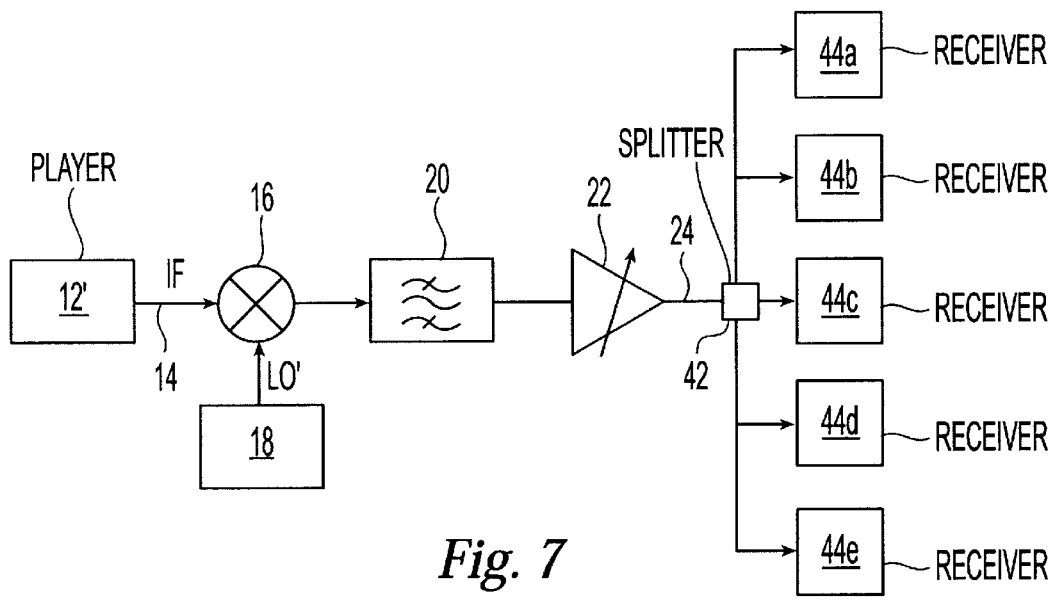
FIG. 7 is a diagram showing a sixth embodiment including the embodiment of FIG. 3.

A sixth embodiment, including the embodiment shown in FIG. 3 will now be described with reference to FIG. 7. In this embodiment, the embodiment of FIG. 3 is used to provide an RF signal for an operator training session to give trainee operators practice in demodulating or analysing signals. The RF signal on the output 24 is connected to a splitter 42 to produce multiple outputs of the same signal. Each of these multiple outputs is connected by a suitable connector to one of a set of receivers 44a to 44f for a corresponding group of trainees, so that each of the trainees can practice demodulating or analysing the same signals.

Figure 8:
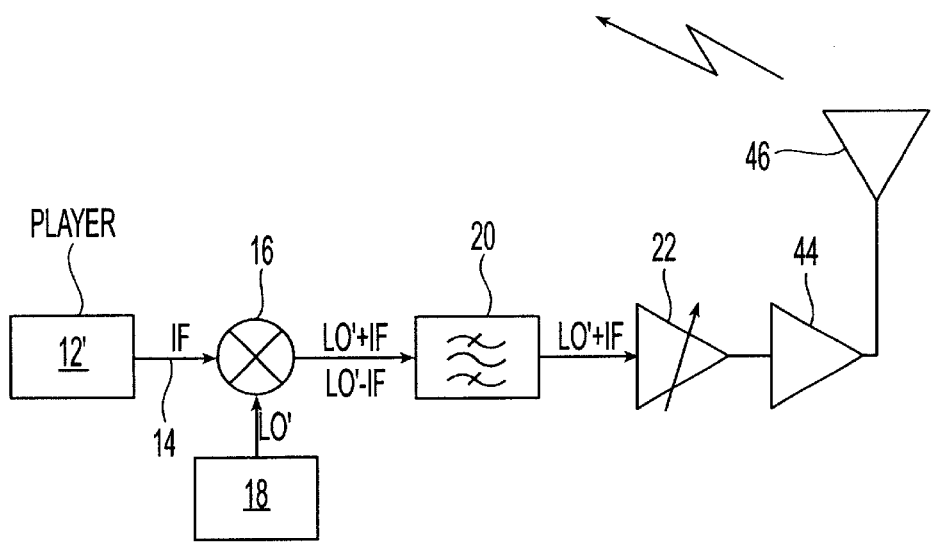
FIG. 8 is a diagram showing a seventh embodiment including the embodiment of FIG. 3.

A seventh embodiment, including the embodiment of FIG. 3 will now be described with reference to FIG. 8, in which the embodiment is used to supply an RF signal for a local radio transmitter, including an amplifier 44 and an antenna 46.

In this way, a radio programme can be modulated into the form in which it is to be transmitted and then recorded by the apparatus shown in FIG. 1. The digital audio medium can then be distributed to local radio stations and reproduced using the apparatus shown in FIG. 8. This embodiment provides an economical way of distributing programme material.

With the advent of digital radio broadcasting, it is thought to be necessary to upgrade local radio transmitters to include advanced digital modulation equipment. However, using the apparatus shown in FIG. 8, the radio programme can be digitally modulated and recorded by a distributor and the local radio station only needs the apparatus shown in FIG. 8 to reproduce the digitally modulated signal, without having to install digital modulation equipment. This is particularly advantageous if numerous incompatible digital radio formats exist, which would otherwise require the local radio station to include numerous sets or digital modulation equipment. The broadcast frequency may be varied by controlling the frequency LO'.

The above embodiments are given purely by way of example and the present invention is not limited thereto. Other digital audio recording, distribution and playback techniques may be used and it is expected that new methods providing greater storage capacity and/or fidelity of recording and playback will be developed. Such variants are not excluded from the scope of the present invention.

The present invention is not limited to use with modulated signals of any specific system, such as one of the Inmarsat™ systems, but may be applied to any situation in which it is desired to record and/or reproduce modulated signals while preserving their characteristics. The recorded and/or reproduced signals may be RF signals. Alternatively, modulated test signals may be output by test modems in the audio frequency range and therefore may be recorded without down conversion. Such signals may be reproduced in the audio frequency range for use with test equipment, or may be up converted into a radio frequency band.

What is claimed is:

1. Transceiver testing apparatus, comprising:
   a first storage means storing first digital data representing a first modulated signal for output to a transceiver,
   a digital-to-analog converter arranged to receive said first digital data from said first storage means and to convert said first digital data to generate said first modulated signal in an audio frequency range,
   wherein amplitude, phase and frequency information recorded in said first digital data are reproduced in said first modulated signal;
   the testing apparatus further comprising:
      means for outputting a second modulated signal from the transceiver in the audio frequency range;
      an analog-to-digital converter arranged to receive said second modulated signal and to convert the second modulated signal to second digital data; and
      a second storage means arranged to store said second digital data such that amplitude, phase and frequency characteristics of the second modulated signal are recorded in said stored second digital data; and
      a connector arranged to supply the first modulated signal output by the digital-to-analog converter to an analog input of said analog-to-digital converter.

2. Apparatus as claimed in claim 1, wherein said analog to digital converter has first and second channel inputs, the first channel input being connected to said connector and the second channel input being arranged to receive the second modulated signal output by the transceiver.

3. Apparatus as claimed in claim 2, wherein the first and second channel inputs comprise stereo audio inputs.

4. Apparatus as claimed in claim 1 or 2, wherein said means for outputting said second modulated signal comprises down-converting means for down-converting in frequency a modulated radio frequency signal from said transceiver to generate said second modulated signal in the audio frequency range.

5. Apparatus as claimed in claim 1 or 2, including an amplifier arranged to amplify the output second modulated signal for input to the analog-to-digital converter.

6. Apparatus as claimed in claim 1 or 2, including up-converting means for up-converting the first modulated signal from said audio frequency range to a radio frequency band.

7. Apparatus as claimed in claim 6, including an amplifier for amplifying said first modulated signal in the radio frequency band.

8. Apparatus as claimed in claim 1, wherein the first and/or second storage means comprises digital tape storage equipment.

9. Apparatus as claimed in claim 1, wherein the first and/or second storage means comprises optical disc storage equipment.

10. Apparatus as claimed in claim 1 wherein the first and/or second storage means comprises an electronic memory.

11. Apparatus as claimed in claim 1, wherein the first and/or second storage means comprises magnetic disc storage equipment.

* * * * *